United States Patent
Kaimal et al.

(10) Patent No.: US 11,962,621 B2
(45) Date of Patent: Apr. 16, 2024

(54) APPLYING NETWORK ACCESS CONTROL CONFIGURATIONS WITH A NETWORK SWITCH BASED ON DEVICE HEALTH

(71) Applicant: Sophos Limited, Abingdon (GB)

(72) Inventors: Biju Ramachandra Kaimal, Bangalore (IN); Andrew J. Thomas, Long Wittenham (GB); Kerav Vaidya, Peterborough, NH (US); Yogesh Bansal, Bangalore (IN); Robert Paul Andrews, Pflugerville, TX (US)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/749,493

(22) Filed: May 20, 2022

(65) Prior Publication Data

US 2023/0319113 A1 Oct. 5, 2023

(30) Foreign Application Priority Data

Mar. 31, 2022 (IN) .............................. 202211019566

(51) Int. Cl.
*H04L 9/40* (2022.01)
(52) U.S. Cl.
CPC ............ *H04L 63/20* (2013.01); *H04L 63/101* (2013.01)
(58) Field of Classification Search
CPC ............................. H04L 63/20; H04L 63/101
See application file for complete search history.

(56) References Cited

U.S. PATENT DOCUMENTS

| | | | |
|---|---|---|---|
| 8,533,842 B1* | 9/2013 | Satish | H04L 63/20 726/25 |
| 2017/0353308 A1* | 12/2017 | Reitsma | H04L 63/20 |
| 2018/0288079 A1* | 10/2018 | Muddu | G06F 40/134 |
| 2019/0036926 A1* | 1/2019 | Isola | H04L 63/1425 |
| 2019/0124042 A1* | 4/2019 | Thomas | H04L 63/1491 |
| 2019/0124097 A1* | 4/2019 | Thomas | G06F 21/43 |
| 2019/0124098 A1* | 4/2019 | Thomas | G06F 21/44 |
| 2019/0141056 A1* | 5/2019 | Estabrooks | H04W 12/79 |
| 2019/0312838 A1* | 10/2019 | Grimm | H04L 41/40 |

(Continued)

OTHER PUBLICATIONS

International Search Report and Written Opinion in PCT/GB2023/050483 mailed on Jun. 14, 2023.

*Primary Examiner* — Yonas A Bayou
(74) *Attorney, Agent, or Firm* — Schmeiser, Olsen & Watts LLP; Victor J. Baranowski

(57) ABSTRACT

A method includes receiving, by a computer system, information related to device health of an electronic device, determining, by the computer system, a health status of the electronic device based at least in part on the received information related to the device health of the electronic device, requesting, by a switch having a port connected to the electronic device, the health status of the electronic device from the computer system, receiving, by the computer system, the request for the health status of the electronic device from the switch, transmitting, by the computer system, the health status of the electronic device to the switch, evaluating, by the switch, the transmitted health status of the electronic device using network access rules associated corresponding to health statuses, and applying, by the switch, a network access control configuration to the port of the switch based on the evaluating the transmitted health status.

20 Claims, 10 Drawing Sheets

(56) References Cited

U.S. PATENT DOCUMENTS

| | | | |
|---|---|---|---|
| 2019/0312839 A1* | 10/2019 | Grimm | H04L 63/20 |
| 2019/0312843 A1* | 10/2019 | Grimm | H04L 63/0236 |
| 2019/0312888 A1* | 10/2019 | Grimm | H04L 63/0272 |
| 2020/0336914 A1* | 10/2020 | Kaushik | H04W 64/003 |
| 2021/0195412 A1 | 6/2021 | Kaushik et al. | |

* cited by examiner

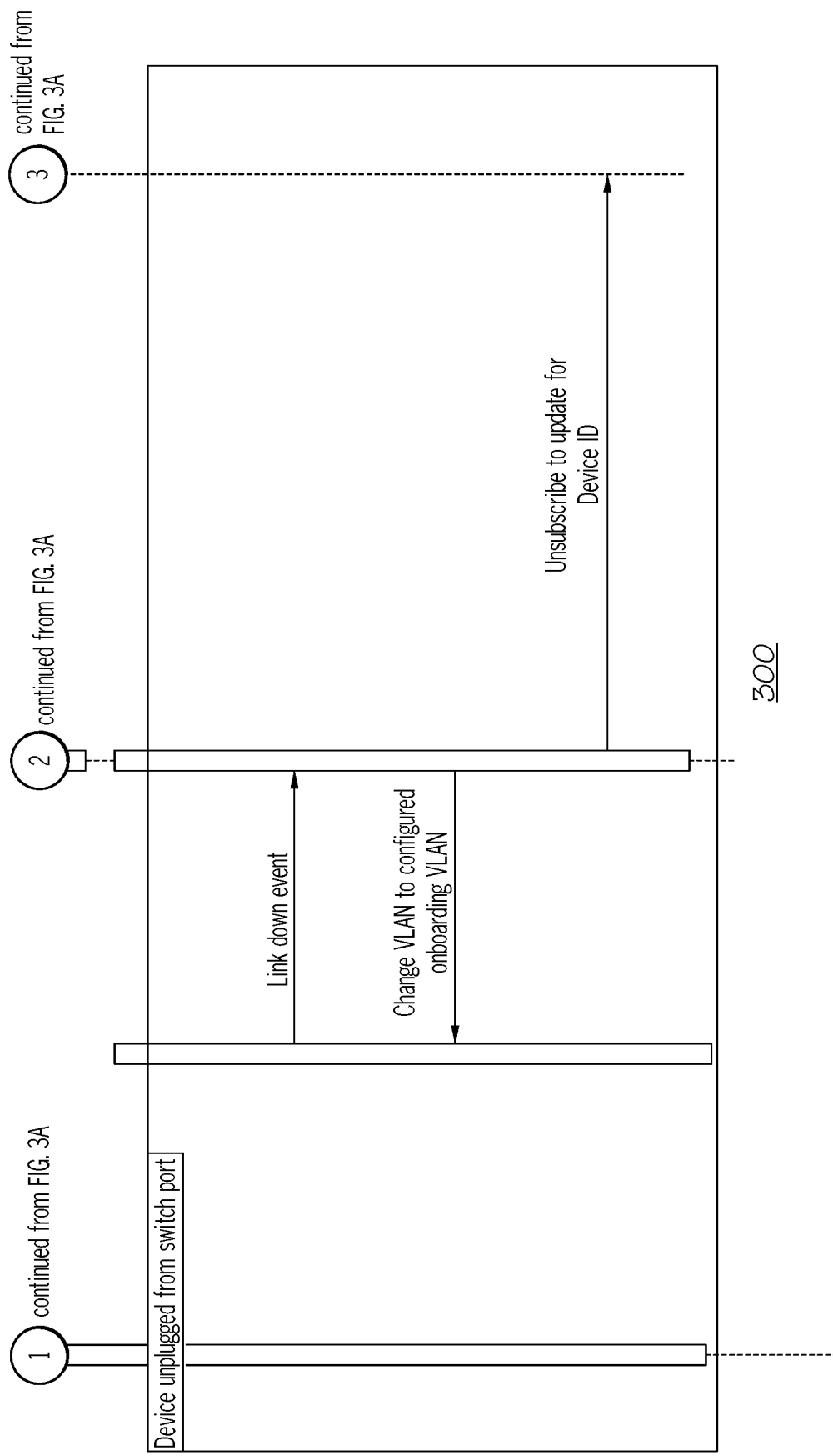

APPLYING NETWORK ACCESS CONTROL CONFIGURATIONS WITH A NETWORK SWITCH BASED ON DEVICE HEALTH

RELATED APPLICATION

This application claims the benefit of the earlier filing date of Indian Patent Application Serial No. 202211019566 filed Mar. 31, 2022, the entirety of which is incorporated herein by reference.

TECHNICAL FIELD

The present disclosure relates generally to network switches, and control of network switches. More specifically, this application describes assigning network access to devices connecting to a network switch based on a health state of the connecting devices.

BACKGROUND

A network switch connects computing devices to a network and assigns them to specific virtual local area networks (VLANs) or applies access control lists (ACLs) based on a static configuration created manually by an administrator. In other words, an administrator of a network switch can assign a specific VLAN to a switch port or manually apply an ACL to a switch port. A network switch can also act as a remote authentication dial-in user service (RADIUS) client and authenticate connected devices with a RADIUS server. However, present network switch technology cannot dynamically and automatically apply access control configurations to switch ports based on information received regarding device health of a connecting device.

Embodiments were therefore conceived in light of the above-mentioned needs, challenges and/or limitations, among other things.

SUMMARY

According to embodiments disclosed herein, a method, and associated computer system and computer program product for applying a network access control configuration associated with a network switch is provided. According to the method, information related to device health of an electronic device is received by one or more computers of a computer system. A health status of the electronic device based at least in part on the received information related to the device health of the electronic device is determined by the one or more processors of the computer system. The health status of the electronic device is requested from the one or more processors of the computer system by the network switch having a port connected to the electronic device. The request for the health status of the electronic device is received from the network switch by the one or more processors of the computer system. The health status of the electronic device is transmitted to the network switch by the one or more processors of the computer system. The transmitted health status of the electronic device is received by the network switch. The transmitted health status of the electronic device is evaluated by the network switch using network access rules corresponding to health statuses. A network access control configuration is applied by the network switch to the port of the network switch based on the evaluating the transmitted health status of the electronic device using the network access rules.

BRIEF DESCRIPTION OF THE DRAWINGS

FIG. 3B depicts a second portion of a sequence diagram of a method of applying network access control configurations with a network switch based on device health according to an example embodiment.

DETAILED DESCRIPTION

Figure 1:
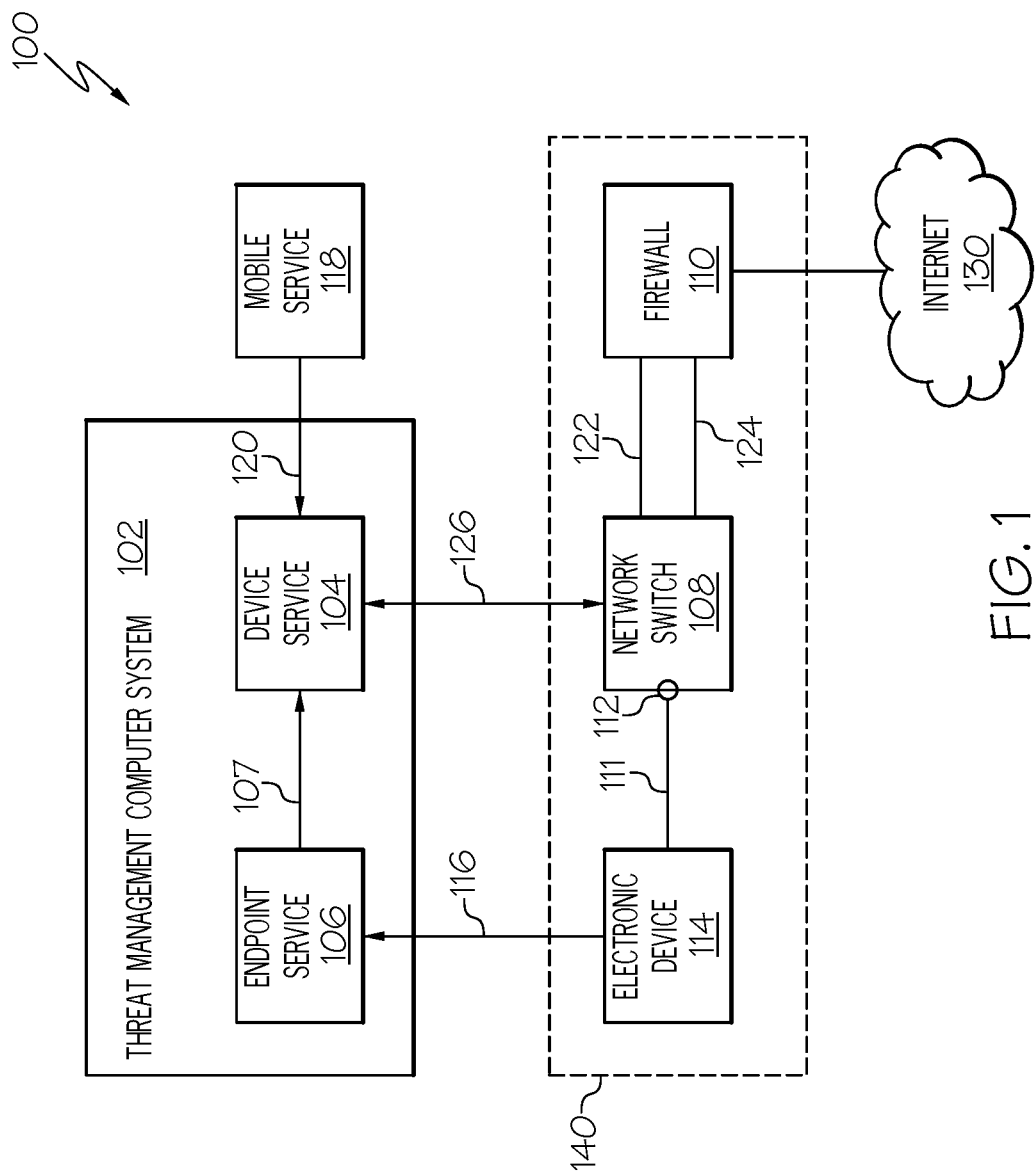
FIG. 1 depicts a network switch service architecture according to an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like.

Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein describe how a network switch can natively, dynamically and automatically apply a virtual local area network (VLAN) or an access control list (ACL) or block a switch port based on a determination of a health of the connecting device. The device health can be computed by an agent running on the device itself and sent to the network switch. Alternatively, the network switch may fetch the device health from a cloud service at a cloud-based threat management computer system and change the VLAN or ACL setting based on the state received. This effectively changes what the device is allowed to do on the network in a dynamic manner based on the information received by the network switch as to device health status. For example, if a device is in a "red state" indicating a security or device health problem, then the switch can drop the device into a VLAN with limited access to network services. From here, a user of the device can remediate the problems associated with the device health. Once remediation is complete, the device health status may be updated, either within the device health monitoring agent of the device itself or at the threat management computer system. This updated health status may then be provided to the switch, after which point the switch automatically applies the normal VLAN to the device. The threat management computer system may be a cloud service which forms a central repository of the device information, such that all devices on the network connected to the network switch send their health status to the threat management computer system to analysis. The network switch may contact the threat management computer system when the device is connecting to the network, as well as receive periodic updates which account for changes in device health statuses. The network switch can thereby apply policy settings for switch ports dynamically, automatically, and responsively to newly received information accordingly.

FIG. 1 depicts a network switch service architecture 100. The service architecture 100 is shown including a threat management computer system 102 having a device service 104 connected to an endpoint service 106 via an information channel 107. Connected to device service 104, but located outside the threat management computer system 102, is a network switch 108 which is connected to a firewall 110. An electronic device 114 is connected to a port 112 of the network switch 108 via a network connection 111. The electronic device 114, the network switch 108 and the firewall 110 may all be included in an enterprise system 140. The electronic device 114 is further connected to the endpoint service 106 via information channel 116. A mobile service 118 is also connected to the device service 104 via information channel 120. The network switch 108 provides access to a first VLAN 122 and a second VLAN 124, which then connect through the firewall 110 to an outside network, such as the internet 130. The network switch 108 is further connected to the device service 104 via connection 126.

The threat management computer system 102 may be a threat management facility, such as the threat management facility 700 shown in FIG. 7 and described below. The threat management computer system 102 may be a cloud service system which is connectable to the enterprise system 140. The enterprise system 140 may be an enterprise facility having a network of endpoints, such as the network 702 shown in FIG. 7 and described below. The enterprise system 140 may be considered a customer, client, subscriber, or the like, of the services provided by the threat management computer system 102.

The device service 104 of the threat management system 102 may be a software environment that includes a combination of software and/or hardware configured to analyze events and/or information or data received by the device service 104 and perform threat and/or device health analysis on the information to determine a device health status associated with particular devices, and/or user accounts associated with those particular devices. The device service 104 may include systems configured to receive information about devices, such as via the information channel 107 from the endpoint service 106. The endpoint service 106 may be a service configured to process incoming device health information from devices or endpoints associated with the enterprise computer system 140. The device service 104 may also receive information directly from a device or outside service, such as the mobile service 118, via the information channel 120, which may represent information coming to the endpoint service 106 directly from outside the threat management computer system 102 and/or outside the enterprise system 140.

The device service 104 may be configured to characterize the received information in accordance with the principles shown in FIG. 8 and described below. In particular, the device service 104 may be configured to characterize device health using a coloring system, such as the coloring system 810 (shown in FIG. 8). Thus, the device service 104 may include software and/or hardware that is capable of receiving, analyzing and processing information related to device health, and make determinations according to that information as to the health of a device. In this manner, device service 104 may be configured to determine a health status of an electronic device in, or otherwise associated with, the enterprise computer system 140, such as the electronic device 114. To accomplish this, the device service 104 may be configured to analyze historical device activity across one or more devices associated with a user account associated with the electronic device 114.

The device service 104 may further be in communication with the network switch 108 in order to provide device health information to the network switch 108 for processing by the network switch 108. The device service 104 may provide updates, periodically or aperiodically, to other endpoints in the network switch service architecture 100, such as the network switch 108, in accordance with a heartbeat system, such as the heartbeat system 814 (shown in FIG. 8). Specifically, the device service 104 may be configured to receive a request for device health status from the network switch 108 and respond in kind by transmitting the health status in response to the request.

The electronic device 114 connecting to the network switch 108 may be any type of electronic device known in the art, such as a personal computer, a laptop computer, a desktop computer, a surface computer, a mobile device, an internet of things (IoT) device, or the like. Any type of device or endpoint connectable to a network switch is contemplated.

The network switch 108 may be a switch having any number of ports, such as an 8-port switch, a 24-port switch or a 48-port switch. The network switch 108 may include Power over Ethernet (PoE) technology, allowing both connection to and powering of devices using PoE technology. The network switch 108 may be configured to segment internal traffic through the network switch 108 into various secure VLANs, such as the VLANs 122, 124, which may be protected by the firewall 110 and ACLs applied by the switch. The network switch 108 may be deployable in a software defined wide area network (SD-WAN) of the enterprise computer system 140. The network switch 108 may be configurable remotely by the connection 126 to the device service 104 of the threat management computer system 102.

While the enterprise computer system 140 is shown including the first and second VLANs 122, 124, it should be understood that the network switch 108 may be configured to provide network traffic through any number of VLANs, while applying any number of ACLs. In operation, the service architecture 100 provide for the network switch 108 applying network access control configurations based on device health, in accordance with any of the techniques described hereinbelow in conjunction with FIGS. 2-6.

While the embodiment shown contemplates the device service 104 receiving device health information in order to process, analyze, and make determinations as to device health statuses, in other embodiments, the electronic devices 114 may be deployed with software security agents which locally determine device health and provide this device health information directly to the network switch, without the need for processing by the threat management computer system 102 and the device service 104 thereof. Whatever the embodiment, the network switch 108 may be programmed or otherwise configured to automatically apply rules on particular ports related to changing VLANs, applying specific ACLs and/or blocking network traffic through switch ports, based on known device health information associated with devices connected to those switch ports.

Figure 2:
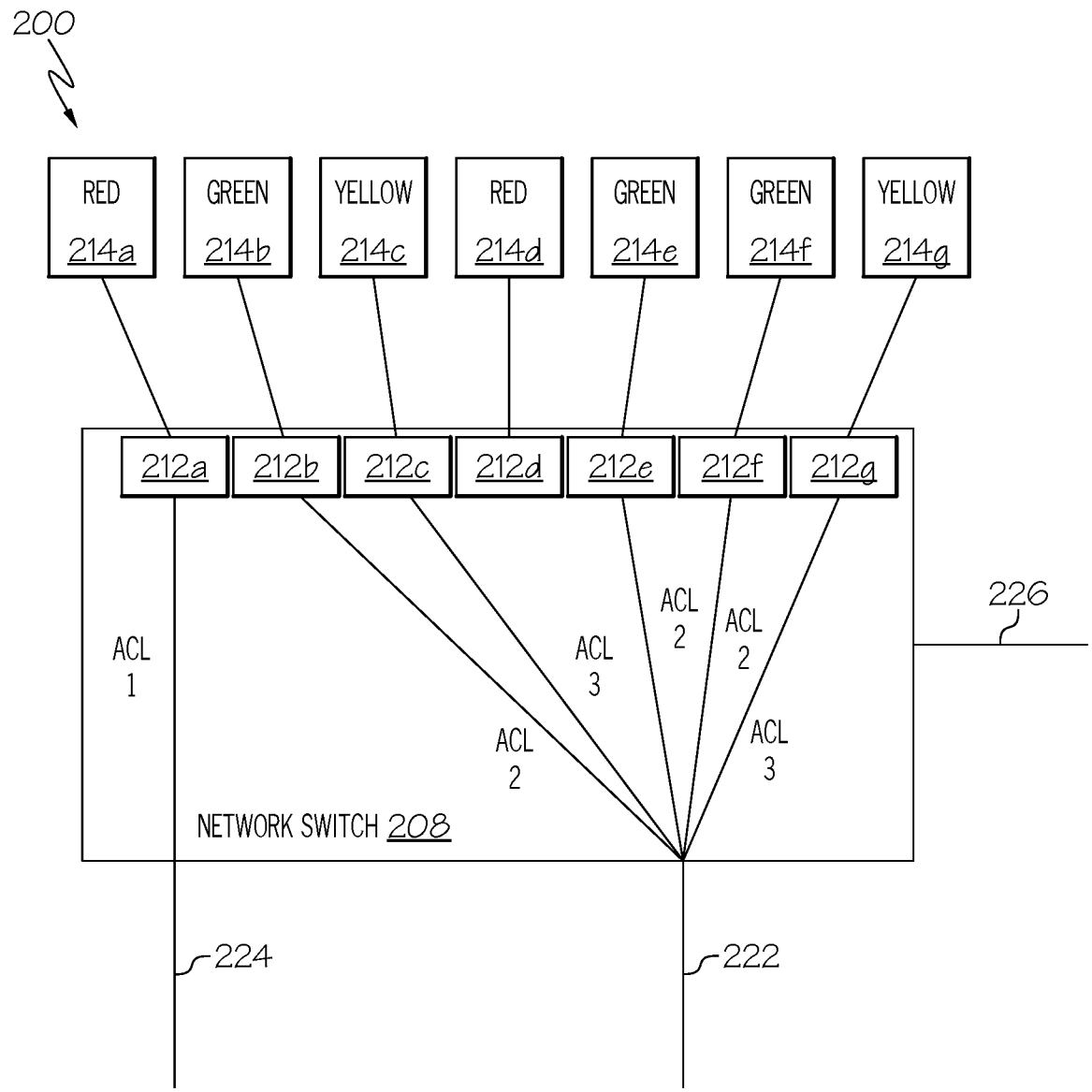
FIG. 2 depicts a network switch connected to a plurality of electronic devices according to an example embodiment.

FIG. 2 depicts a network switch 208 connected to a plurality of electronic devices 214a, 214b, 214c, 214d, 214e, 214f, 214g through a plurality of corresponding switch ports 212a, 212b, 212c, 212d, 212e, 212f, 212g. Each of the particular plurality of electronic devices 214a, 214b, 214c, 214d, 214e, 214f, 214g may be any type of electronic device, like the electronic device 114, and may each include an individual media access control (MAC) address, which may be used by the network switch 208 in order to associate device health status with specific devices. Specifically, both the network switch 208, and a device service (such as the device service 104 of FIG. 1) remotely connected to the network switch 208 via the connection 226, may use the MAC address identification information in order to change port settings based on device health. In particular, the network switch 208 may request from a device service of a threat management computer system device health status information associated with particular MAC addresses determined by the network switch 208 to be connected to network switch ports. In the embodiment shown, the network switch 208 may request seven different device health statuses from the device service, one corresponding to each of the plurality of electronic devices 214a, 214b, 214c, 214d, 214e, 214f, 214g.

Moreover, as shown, each of the particular ports 212a, 212b, 212c, 212d, 212e, 212f, 212g may be configured with its own port configuration, corresponding to a device health status of the particular device 214a, 214b, 214c, 214d, 214e, 214f, 214g. In particular, a first electronic device 214a is shown having a "Red" device health status, signifying a security or device health status problem. As such, the network switch 208 is configured to drop the first electronic device 214a into a restrictive VLAN 224. The restricted VLAN 224 may restrict various network capabilities and information and data transfer which would otherwise be allowed under the unrestricted VLAN 222. The network switch 208 may further be configured to apply a first ACL scheme to the first port 212a and the first device 214a.

A second device 214b is shown having a "Green" device health status, signifying a healthy device without known security issues. With this device health status, the network switch 208 has configured the second port 212b to connect to the unrestricted VLAN 222, and apply a second ACL scheme. A third device 214c is shown having a "Yellow" device health status, signifying a device which includes a security issue that should be fixed, but may not be a critical issue necessitating a drop from the unrestricted VLAN 222. While not shown, in other embodiments, a "Yellow" device health status may necessitate a drop from the unrestricted VLAN 222 to a semi-restricted VLAN, which may be more restrictive than the unrestricted VLAN 222 but less restrictive than the restricted VLAN 224. Thus, the network switch 208 has configured the third port 212c to connect to the unrestricted VLAN 222, but applying a third ACL scheme, which may be more restrictive than the second. A fourth device 214d having a "Red" device health status is shown connected to the fourth port 212d. Because of the nature of the issue associated with the fourth device 214d, the network device 208 has completely blocked access downstream through the fourth port 212d. Finally, fifth device 214e and the sixth device 214f, connected to the fifth port 212e, 212f, respectively, are each in the "Green" device health state and are connected, by the network device 208 to the unrestricted VLAN 222 with the second ACL settings applied (similar to the second device 214b). Finally, the seventh device 214g connected to the seventh port 212g is in a "Yellow" device health state, and thereby is connected to the unrestricted VLAN 222 with third ACL settings applied (similar to the third device 214c).

It should be understood that FIG. 2 displays one particular configuration, but any number of embodiments are contemplated having any number of different ACL settings and VLANs, device health states, network ports, and the like. Whatever the embodiment, the network switch 208 may be configured to obtain device health statuses either directly from devices, or from a device service of a threat management computer system (like shown in FIG. 1) and apply a ruleset, algorithm, model or the like, which may be preconfigured by an administrator of the network switch 208. This programming may be done remotely from the device service of the threat management computer system, or done locally by a local administrator of the network switch 208.

The ruleset, algorithm, model or the like of the network switch 208 may provide for the switch 208 to automatically configured respective ports associated with new device state information, as it is received, for example in real time. Thus, as new information is received, the network switch 208 may receive, analyze and/or process this new information in accordance with the ruleset, settings, algorithm, model or the like, and responsively and automatically make changes to the appropriate port by applying a different ACL or connecting to a different VLAN.

Figure 3A:
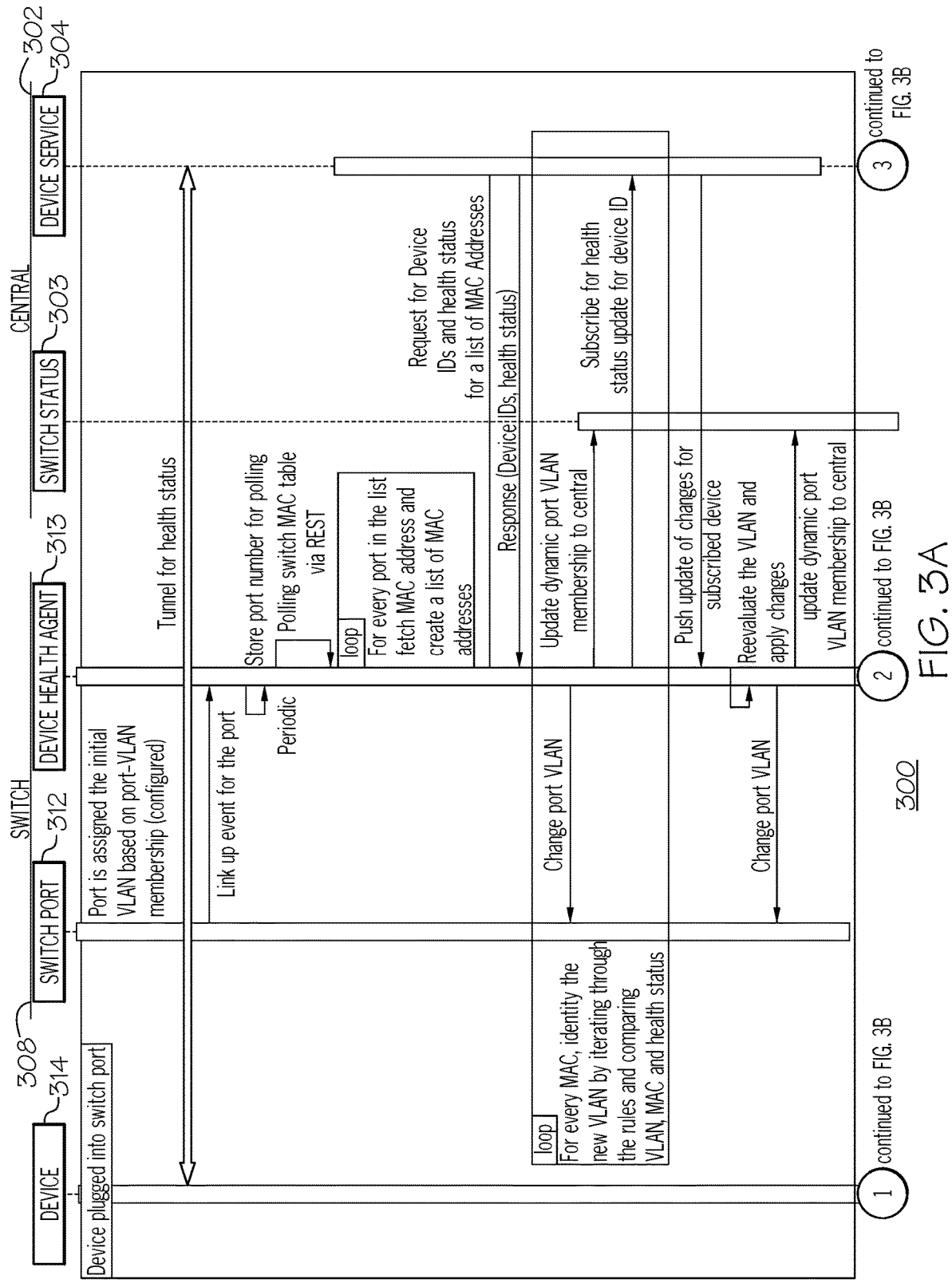
FIG. 3A depicts a first portion of a sequence diagram of a method of applying network access control configurations with a network switch based on device health according to an example embodiment.

FIGS. 3A and 3B in combination depict a sequence diagram 300 of a method of applying network access control configurations with a network switch based on device health, in accordance with an example embodiment. The sequence diagram 300 may be implemented by one or more of the devices, components, and/or systems shown in the accompanying figures, and is discussed by way of reference thereto. The sequence diagram 300 includes the steps taken by a network switch 308 (such as the network switches 108, 208 described above), and a central backend platform 302 (such as the threat management computer system 102 described above) having a device service 304 and a switch status database 303.

The sequence diagram 300 begins when one or more electronic devices 314 are plugged into a switch port 312 of the network switch 308. At this point, the port may be assigned an initial VLAN based on a port-VLAN membership configuration. Concurrent or prior to the connecting of the electronic device 314 to the switch port 312, the electronic device 314 has provided device health status to the device service 304.

Next, a link is established between the switch port 312 and a device health agent 313. The device health agent 313 may be software and/or hardware component of the network switch 308 configured to process device health status information and may include the ruleset, settings, algorithms, models or the like which allow the network switch 308 to apply changes to ports based on device health status information received. From here, polling takes place by the device health agent 313, which may conform with constraints of a Representational State Transfer (REST) architecture. For every port connected to a device, including the switch port 312, a MAC address is fetched associated with the connected device 314, and a list is created by the device health agent 313 containing the set of MAC addresses for connecting devices.

Next, the device health agent 313 requests Device ID and health status from the device service 304 from the central backend platform 302. The device service 304 from the central backend platform 302 responds to the request and provides the device ID and health status back to the device health agent 313. The device ID may include MAC addresses associated with the devices.

From here, a loop occurs for each different device, including the device 314, until all devices (and associated MAC addresses) have been processed by the network switch 308. For every MAC address, the device health agent 313 may be configured to iterate through the rules, settings, algorithms, models or the like which compare the device health status to specific VLANs and/or applicable ACLs. These rules, settings, algorithms, models or the like may also be device specific, or be applicable rules based on a category of a user associated with a device.

Based on the rules, settings, algorithms, models or the like, the device health agent 313 changes the port settings, such as the port VLAN, and then updates the switch status database 303 with the status of the port 312 for the device 314 at the central backend platform 302. Further, the device health agent 313 subscribes to updates for the particular devices connected to the switch. This update subscription may then prompt the device service 304 of the central backend platform 302 to provide updated device health status information back to the device health agent 313 when a change in status occurs (e.g. a remedial action is taken or a device becomes a lesser threat).

At regular or aperiodic intervals, the device service 304 may provide updates back to the device health agent 313. These updates may be based on a passage of time, or alternatively occur promptly and immediately whenever a change occurs on a device connected to the network switch 308. When an update is received by the device health agent 313, the switch service then reevaluates the port settings, based on the rules, settings, algorithms, models or the like, and changes the settings, such as the port VLAN and once again updates the switch status database 303 with the new status of the port 312 for the device 314 at the central backend platform 302.

Finally, when the device 314 is unplugged from the switch port 312, and disconnects from the network switch 308, device health agent 313 senses this activity as a link down event and changes the VLAN status of the switch port 312 back to the original onboarding VLAN, ready for a new device to connect to the port. Upon disconnecting, the device health agent 313 further unsubscribes to the device health updates from the device service 304 of the central backend platform 302.

While the above describes a sequence with a device service 304 as contemplated, other systems are contemplated whereby the device service 304 is a local component of the device 314 itself. In this embodiment, the network switch 308 is configured to request device ID and health status from an agent running on the device 314 itself, including subscribing to updates and the like.

Figure 4:
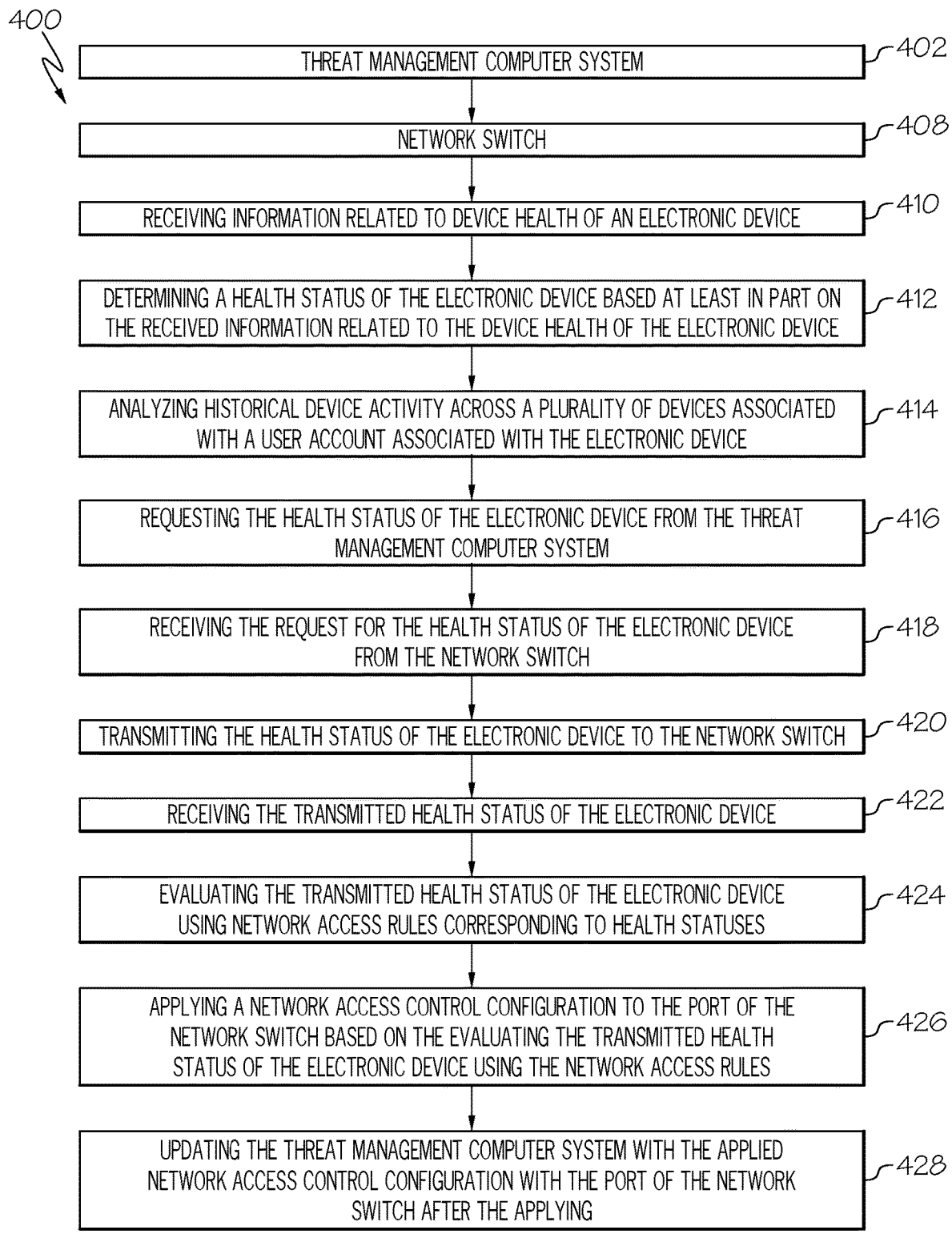
FIG. 4 depicts a method, according to an example embodiment, of applying network access control configurations based on device health using a network switch connected to threat management computer system.

FIG. 4 depicts a method 400 of applying network access control configurations based on device health using a network switch 408 connected to a threat management computer system, in accordance with an example embodiment. The method 400 may be implemented by one or more of the devices, components, and/or systems shown in the accompanying figures, and is discussed by way of reference thereto. In particular, the method 400 relates to a method for applying switch port settings by the network switch 408 when an electronic device is connected to a switch port. In one embodiment, the method 400 includes steps performable by a threat management computer system 402, listed on the left, and steps performable by a network switch 408, listed on the right.

According to a first step 410 of the method 400, the threat management computer system 402 receives information related to device health of an electronic device being connected to, or already having been connected to, a switch port. The device health information may include historical information received over time from the electronic device being connected to the switch and/or other electronic devices associated with a user account. In other embodiments, the device health information may only relate to the specific device health of the electronic device at present, or at specific point in time. The device health information may relate to user and/or device activity, device status, applications running, subscriptions, cookies accepted, browsing history, or any other relevant information. In other embodiments, the device health information may be a more generalized status or device health state at a given point in time, as calculated by a local device health monitoring service or security agent running locally on the device itself. Whatever the embodiment, the threat management computer system 402 receives device health information at the step 410.

The method 400 includes a next step 412 of determining, by the threat management computer system 402, a health status of the electronic device based at least in part on the received information related to the device health of the electronic device. This determination may be made by an analysis engine, module, ruleset, algorithm or the like, which may be configured to make determinations of a health status of an electronic device based on the received information. For example, the step 412 may include assigning a color state, using the coloring system described below and shown in FIG. 8, based on the determined device health. For example, if a device is determined to be in a compromised or problematic state, the step 412 may include assigning the device health a "Red" status. If a device is determined to be in a state with a heightened potential for a future security problem, a "Yellow" status may be assigned. If a device is determined to be in a health state, a "Green" status may be assigned. While the coloring system described may be one system for applying a label for a device health, other systems are contemplated, which may similarly be used by the network switch 408 in applying port settings.

The method 400 includes a further step 414 of analyzing, by the threat management computer system 402, historical device activity across a plurality of devices associated with a user account associated with the electronic device. Step 414 may include analyzing historical information over time and ascertaining insight from this historical activity when determining health status. Thus, while in some cases a health status may be determined based on present status information alone, embodiments contemplated herein further include accounting for historical information in making a present device health status determination.

The method 400 further includes a step 416 of requesting, by the network switch 408 having a port connected to the electronic device, the health status of the electronic device from the threat management computer system. The step 416 may occur, for example, at or around the time when the electronic device is connected to a switch port of the network switch, pursuant to the exemplary process described and shown in FIGS. 3A and 3B. The method 400 then includes a step 418 of receiving, by the threat management computer system 402, the request for the health status of the electronic device from the network switch, and a step 420 of transmitting, by the threat management computer system 402, the health status of the electronic device to the network switch. The method 400 then includes a step 422 of receiving, by the network switch 408, the transmitted health status of the electronic device.

Next, the method 400 includes a step 424 of evaluating, by the network switch 408, the transmitted health status of the electronic device using network access rules corresponding to health statuses. Network access rules may be applied by an administrator from, for example, a device service system, such as the device service 104. Thus, an administrator may create and apply rules for the network switch 408 remotely. Rules may have match conditions based on any number of factors. For example, rules may be applied based on device health status, user groups, MAC address of a device, user associated with a device, or various other factors, which when matched with received information, may trigger the application of the rule. Rules may be created for applying any number of network access control configurations to a port of the network switch, such as ensuring any connected devices for a given port would be connected to a particular VLAN, or applying specific ACL settings to a given port, or even blocking a given port.

While the rules for the network switch 408 may be created, updated, and/or provided to the network switch 408 from a remote (e.g. cloud-based) administrator, the network switch 408 may include the ability to apply and carry out application of the rules locally. Thus, the method 400 then includes a step 426 of applying, by the network switch, a network access control configuration to the port of the network switch 408 based on the evaluating the transmitted health status of the electronic device using the network access rules. Here, the network switch 408 may switch a particular VLAN for a given port based on a negative device health status, or may apply one or more ACLs to a given port, or may even block a port. Likewise, the network switch 408 may be configured to remove restrictions to a port whenever updated device health information is received indicating a device health status which has been favorably corrected.

Finally, the method 400 includes a step 428 of updating, by the network switch 408, the threat management computer system 402 with the applied network access control configuration for the port of the network switch 408 after the applying. This update may provide the threat management computer system 402 with the present status of switch ports for the network switch 408, for monitoring. An administrator of the threat management computer system 402 may be able to manually change any switch port status that has been automatically changed pursuant to the rules applied by the network switch 408 as contemplated and described.

Figure 5:
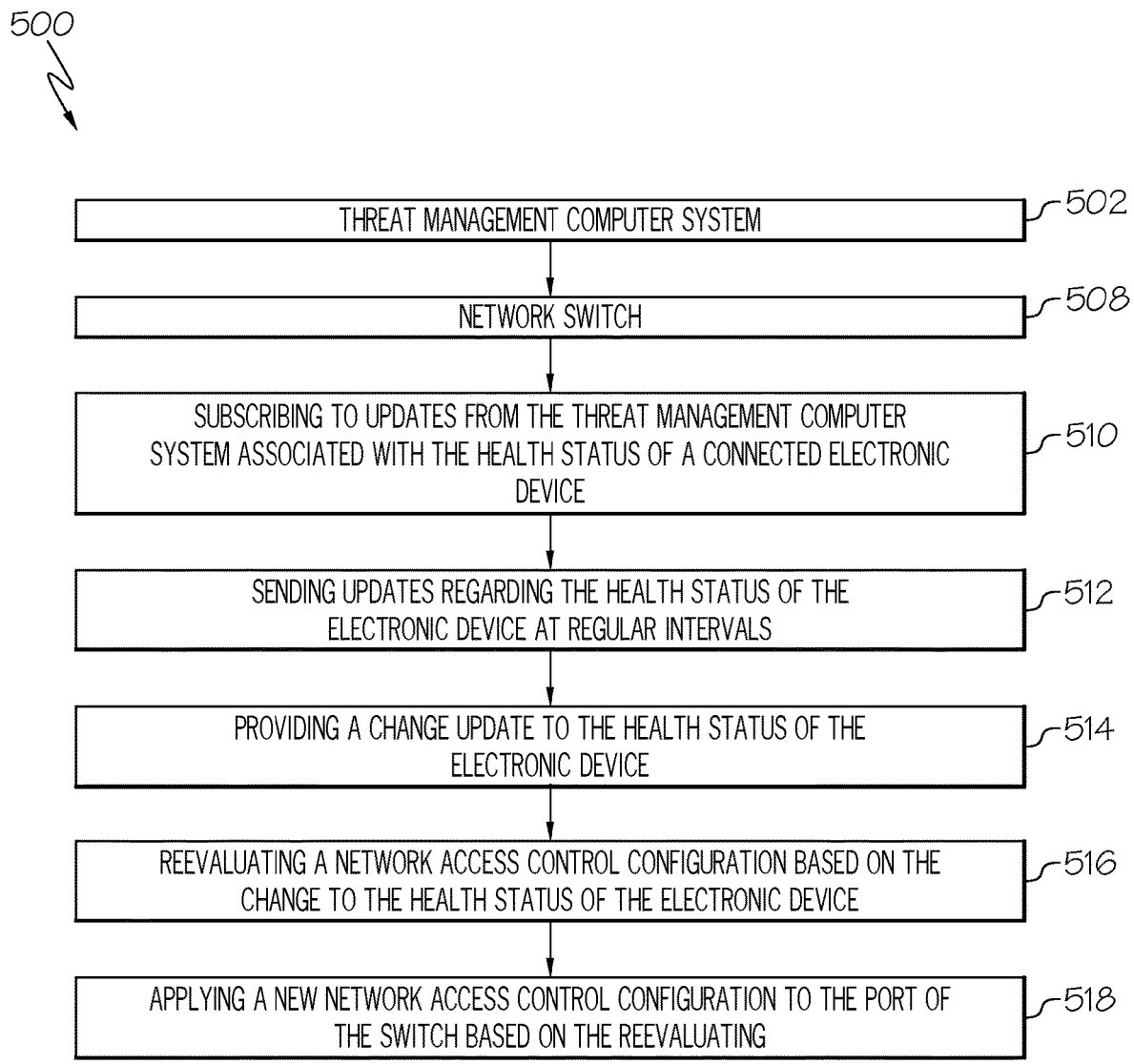
FIG. 5 depicts a method, according to an example embodiment, of controlling a switch by a threat management computer system.

FIG. 5 depicts a method 500 of controlling a switch by a threat management computer system. The method 500 may be implemented by one or more of the devices, components, and/or systems shown in the accompanying figures, and is discussed by way of reference thereto. Like the method 400, the method 500 is described with steps performable by a threat management computer system 502, listed on the left, and steps performable by a network switch 508, listed on the right. The method 500 may be a methodology employed by a network switch after a device has originally been connected and assigned port security settings, such as a VLAN and/or ACLs, based on a device health status of the connecting device. The method 500 may relate to a method of maintaining and updating port security settings on a network switch in response to receiving new or updated information related to device health of connected devices.

According to a first step 510 of the method 500, the network switch 508 subscribes to updates from the threat management computer system 502 associated with the health status of a connected electronic device. While the subscription step may be an interaction between the network switch 508 and a back end remote service, such as the device service 104, 304, in other embodiments, the network switch 508 may subscribe to updates directly from the connected device, or a software service or security agent running on the connected device.

The method 500 then includes a step 512, performable by the threat management computer system 502, of sending updates regarding the health status of the connected electronic device at regular intervals. For example, during the step 512, the updates may denote no change to the device health status, which would then necessitate no further action by the network switch 508. Next, a step 514 may include the threat management computer system 502 providing a change update to the health status of the electronic device 514. Such a step will then necessitate further steps by the network switch 508, as described below with respect to the later steps of the method. While the method 500 contemplates regular periodic updates, regardless of whether a change occurs to device health, in other embodiments, the updates may be sent at aperiodic intervals, such as whenever a change in the health status of the device occurs and is determined by the threat management computer system 502. In still other embodiments, these updates may be sent to the network switch 508 directly from the connected device.

Whatever the embodiment, when the network switch 508 receives the change update of the health status of the electronic device, a step 516 may include the network switch 508 reevaluating a network access control configuration for the electronic device and/or the port of the network switch 508 that the electronic device is connected to, based on the change ito the health status of the electronic device. Finally, at a step 518, the network switch 508 applies a new network access control configuration to the port of the switch based on the reevaluating.

Figure 6:
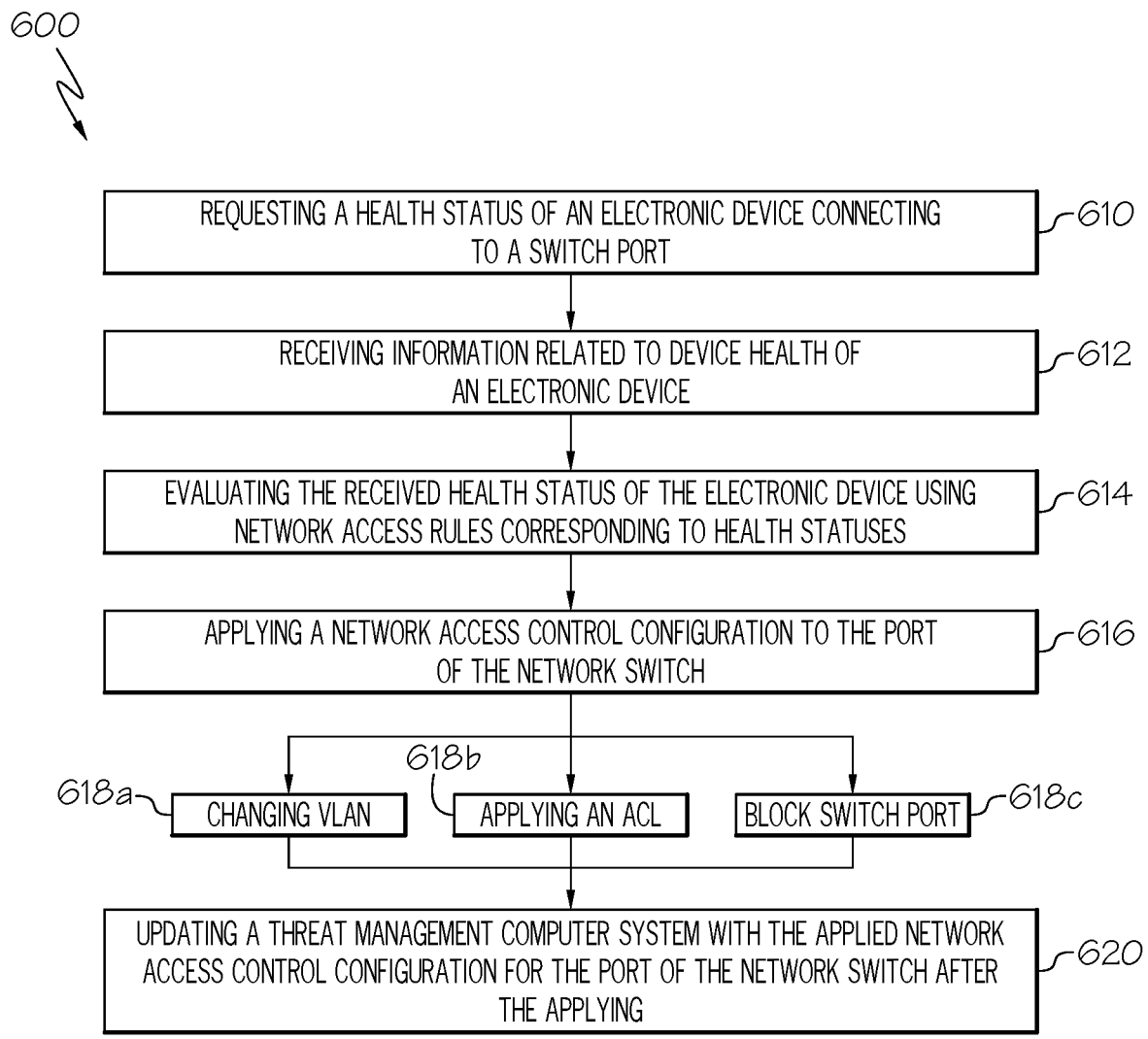
FIG. 6 depicts a method, according to an example embodiment, of applying configurations with a network switch based on device health.

FIG. 6 depicts a method 600 of applying configurations with a network switch based on device health. The method 600 may be implemented by one or more of the devices, components, and/or systems shown in the accompanying figures, and is discussed by way of reference thereto. The method 600 outlines the steps performable by a network switch in order to analyze and apply a ruleset, settings, algorithm, model or the like for settings associated with a switch port connected to a device based on a device health status of the connected device.

The method 600 includes a first step 610 of requesting a health status of an electronic device connected to a port of a network switch. The method 600 includes a next step 612 of receiving that requested information related to the device health of an electronic device by the network switch, or a software service, processor and/or memory system running in the network switch. The method 600 includes a next step 614 of evaluating the received health status of the electronic device using network access rules, settings, algorithms, models or the like, which are associated with or correspond with health status information and/or device identification information (i.e. MAC address information).

The method 600 includes a next step 616 of applying a network access control configuration to the port of the network switch based on the evaluating which took place in step 614. The application of step 616 may take the form of various configuration changes, such as changing a VLAN 618a, applying an ACL configuration 618b, and blocking a switch port completely 618c. The method 600 concludes with a step 620 where the network switch updates a threat management computer system with the applied network access control configuration for the port of the network switch after the applying.

Embodiments of systems described herein may thereby be configured to allow an administrator to create rules or settings so that a switch dynamically reacts to changes in device health statuses. In particular, embodiments may allow an administrator, such as an administrator of a threat management computer system or a local network administrator where a network switch is located, to configure security policy rules associated with switch ports and/or a network switch. Moreover, embodiments may provide such an administrator with a display of health status information for all devices currently connected to a switch port. Embodiments may allow an administrator to override any VLAN settings for specific ports, and assign endpoints or connected devices to different VLANs based on their MAC address or MAC organizationally unique identifier (OUI). Embodiments described herein allow for administrators to assign managed endpoints (i.e. connected devices) to different VLANs, including restricted or protected VLANs based on device health status. It is also possible for an administrator to create rules or settings that allow for the skipping of synchronized security in some VLANs. It may also be possible to assign managed endpoints to different protected VLANs based on user-related information associated with the endpoint or device, such as username and user-group. Embodiments described herein may further generate alerts to administrators when a device status changes, for example when a device status turns "Red."

The foregoing systems, devices, and methods thereby provide a mechanism by which a network switch may dynamically apply changes to a switch port based on device health status information received. The described technologies may be particularly useful in applying security rules upstream from a firewall, and particularly at a network switch which is typically directly connected to a device that might contain a security threat. In other words, it has been found to be particularly advantageous to secure a problematic device (i.e. an unhealthy device) and apply security at a point most proximate to the device itself. In a typical network, there may be many network devices which are interconnected behind a firewall device. Typically, a network switch is one of the first devices an endpoint connects to. Thus, embodiments described herein contemplate applying a rules-based, or policy-based changes to network access control settings of a network switch based on device health information received by the network switch. These technologies, and others described herein, increase the overall security within an organization's digital environment by allowing device health status to be accounted for at a point in a network more proximate to the problem than a firewall device (i.e. at the network switch). The foregoing systems, devices, and methods further provide for the ability to analyze and take into account historical information in determining a device health status, and applying this historical information to change switch port settings.

Figure 7:
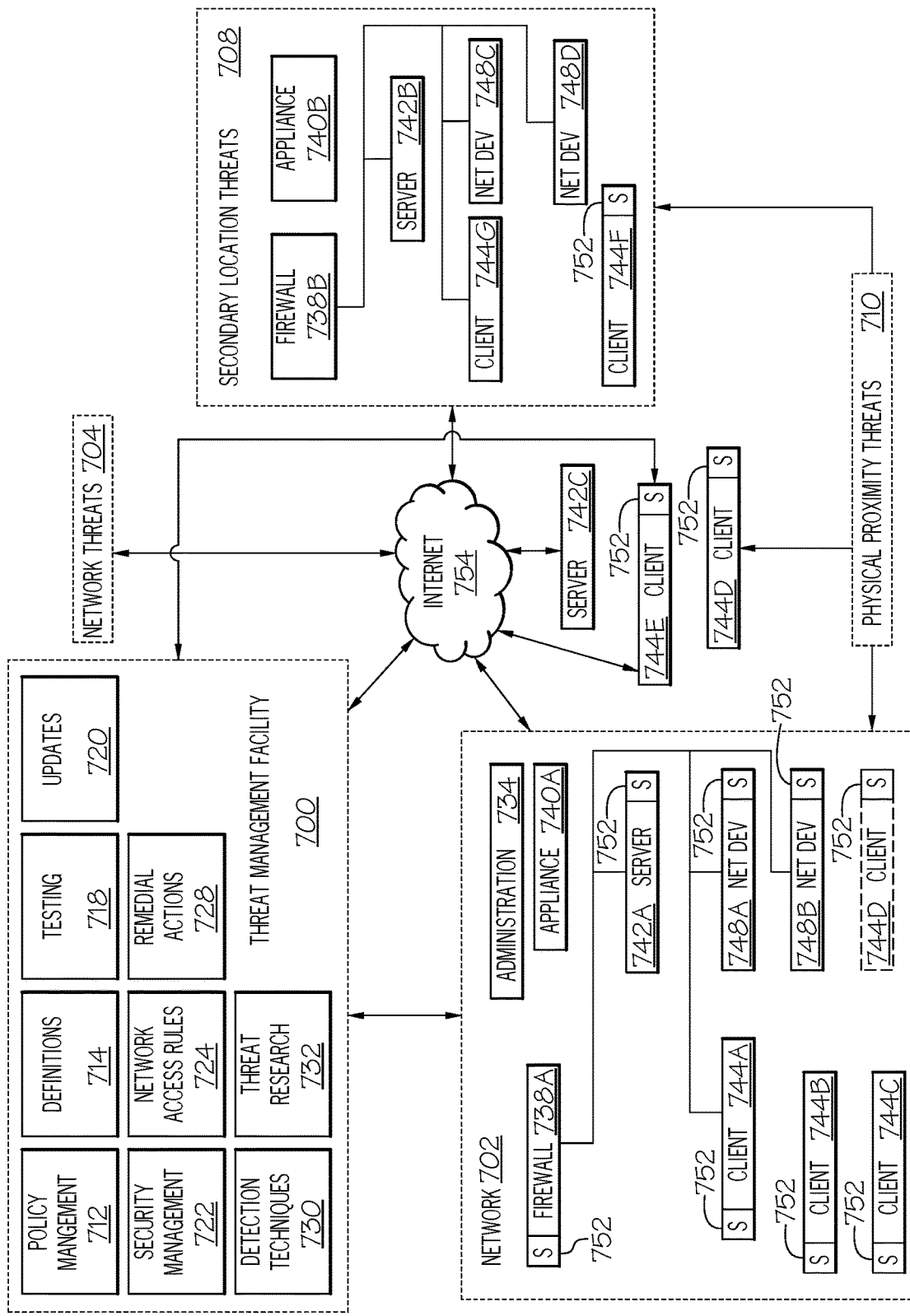
FIG. 7 depicts a diagram of an example environment for threat management according to an example embodiment.

FIG. 7 illustrates an environment for threat management, according to an example embodiment. Specifically, FIG. 7 depicts a block diagram of a threat management facility 700 providing protection to one or more enterprises, networks, locations, users, businesses, etc. against a variety of threats—a context in which the techniques described above may usefully be deployed. The threat management facility 700 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 700, which may update and monitor network devices, users, and assets accordingly.

The threat of malware or other compromises may be present at various points within a network 702 such as laptops, desktops, servers, gateways, communication ports, handheld or mobile devices, IoT devices, firewalls. In addition to controlling or stopping malicious code, a threat management facility 700 may provide policy management to control devices, applications, or users that might otherwise undermine productivity and network performance within the network 702.

The threat management facility 700 may provide protection to network 702 from computer-based malware, including viruses, spyware, adware, Trojans, intrusion, spam, policy abuse, advanced persistent threats, uncontrolled access, and the like. In general, the network 702 may be any networked computer-based infrastructure or the like managed by a threat management facility 702, such as an organization, association, institution, or the like, or a cloud-based facility that is available for subscription by individuals. For example, the network 702 may be a corporate, commercial, educational, governmental, or other network 702, and may include multiple networks, computing resources, and other facilities, may be distributed among more than one geographical locations, and may include administration 734, a firewall 738A, an appliance 740A, a server 742A, network devices 748A-B, clients 744A-D, such as IoT devices or other devices. It will be understood that any reference herein to a client or client facilities may include the clients 744A-D shown in FIG. 7 and vice-versa.

The threat management facility 700 may include computers, software, or other computing facilities supporting a plurality of functions, such as security management facility 722, policy management facility 712, update facility 720, a definitions facility 714, network access rules facility 724, remedial action facility 728, detection techniques facility 730, testing facility 718, a threat research facility 732, and the like. In embodiments, the threat protection provided by the threat management facility 700 may extend beyond the network boundaries of the network 702 to include clients 744D (or client facilities) that have moved into network connectivity not directly associated with or controlled by the network 702. Threats to client facilities may come from a variety of sources, such as from network threats 704, physical proximity threats 710, secondary location threats 708, and the like. Clients 744A-D may be protected from threats even when the client 744A-D is not directly connected or in association with the network 702, such as when a client 744E-F moves in and out of the network 702, for example when interfacing with an unprotected server 742C through the Internet 754, when a client 744F is moving into a secondary location threat 708 network such as interfacing with components 740B, 742B, 748C, 748D that are not protected, and the like.

The threat management facility 700 may use or may be included in an integrated system approach to provide network 702 protection from a plurality of threats to device resources in a plurality of locations and network configurations. The threat management facility 700 may also or instead be deployed as a stand-alone solution. For example, some or all of the threat management facility 700 components may be integrated into a server or servers at a remote location, for example in a cloud computing facility. For example, some or all of the threat management facility 700 components may be integrated into a firewall, gateway, or access point within or at the border of the network 702. In some embodiments, the threat management facility 700 may be integrated into a product, such as a third-party product, e.g., through an application programming interface, which may be deployed on endpoints, on remote servers, on internal servers or gateways for a network, or some combination of these.

The security management facility 722 may include a plurality of elements that provide protection from malware to network 702 device resources in a variety of ways including endpoint security and control, email security and control, web security and control, reputation-based filtering, control of unauthorized users, control of guest and non-compliant computers, and the like. The security management facility 722 may include a local software application that provides protection to one or more network 702 devices. The security management facility 722 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 722 may provide email security and control. The security management facility 722 may also or instead provide for web security and control, such as by helping to detect or block viruses, spyware, malware, unwanted applications, and the like, or by helping to control web browsing activity originating from client devices. In an embodiment, the security management facility 722 may provide for network access control, which may provide control over network connections. In addition, network access control may control access to virtual private networks (VPN) that provide communications networks tunneled through other networks. The security management facility 722 may provide host intrusion prevention through behavioral based protection, which may guard against known or unknown threats by analyzing behavior before or while code executes. The security management facility 722 may provide reputation filtering, which may target or identify sources of code.

In embodiments, the security management facility 722 may provide secure VLANs in a network having a network switch (e.g., according to the methods described above regarding FIGS. 3-6). This aspect of the security management facility may also take place on the firewall 738A (e.g., an access point) or appliance 740A.

In general, the security management facility 722 may support overall security of the network 702 using the various techniques described above, optionally as supplemented by updates of malicious code information and so forth for distribution across the network 702.

The administration facility 734 may provide control over the security management facility 722 when updates are performed. Information from the security management facility 722 may also be sent from the enterprise back to a third party, a vendor, or the like, which may lead to improved performance of the threat management facility 700.

The threat management facility 700 may include a policy management facility 712 configured to take actions, such as to block applications, users, communications, devices, and so on based on determinations made. The policy management facility 712 may employ a set of rules or policies that determine network 702 access permissions for a client 744. In an embodiment, a policy database may include a block list, a black list, an allowed list, a white list, or the like, or combinations of the foregoing, that may provide a list of resources internal or external to the network 702 that may or may not be accessed by client devices 744. The policy management facility 712 may also or instead include rule-based filtering of access requests or resource requests, or other suitable techniques for controlling access to resources consistent with a corresponding policy.

In embodiments, the policy management facility 712 may include secure VLANs in a network environment. The policy management facility may include policies to permit or deny access, to take remedial action, to issue alerts, and so on based on particular device health determinations.

The policy management facility 712 may also or instead provide configuration policies to be used to compare and control the configuration of applications, operating systems, hardware, devices, network associated with the network 702. An evolving threat environment may dictate timely updates, and thus an update management facility 720 may also be provided by the threat management facility 700. In addition, a policy management facility 712 may require update management (e.g., as provided by the update facility 720 herein described). In embodiments, the update management facility 720 may provide for patch management or other software updating, version control, and so forth.

The security facility 722 and policy management facility 712 may push information to the network 702 and/or a given client 744. The network 702 and/or client 744 may also or instead request information from the security facility 722 and/or policy management facility 712, network server facilities 742, or there may be a combination of pushing and pulling of information. In an embodiment, the policy management facility 712 and the security facility 722 management update modules may work in concert to provide information to the network 702 and/or client 744 facility for control of applications, devices, users, and so on.

As threats are identified and characterized, the threat management facility 700 may create updates that may be used to allow the threat management facility 700 to detect and remediate malicious software, unwanted applications, configuration and policy changes, and the like. The threat definition facility 714 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 722 when scanning files or applications within the client facility for the determination of malicious code that may be within the file or application. A definition management facility may include a definition for a neural network or other recognition engine. A definition management facility 714 may provide timely updates of definition files information to the network, client facilities, and the like.

The security management facility 722 may be used to scan an outgoing file and verify that the outgoing file is permitted to be transmitted per the enterprise facility 702 rules and policies. By checking outgoing files, the security management facility 722 may be able to discover malicious code infected files that were not detected as incoming files.

The threat management facility 700 may provide controlled access to the network 702. A network access rules facility 724 may be responsible for determining if a client facility 744 application should be granted access to a requested network resource. In an embodiment, the network access rules facility 724 may verify access rights for client facilities 744 to or from the network 702 or may verify access rights of computer facilities to or from external networks. When network access for a client facility is denied, the network access rules facility 724 may send an information file to the client facility, e.g., a command or command file that the remedial action facility 728 may access and take action upon. The network access rules facility 724 may include one or more databases that may include a block list, a black list, an allowed list, a white list, a reputation list, an unacceptable network resource database, an acceptable network resource database, a network resource reputation database, or the like. The network access rules facility 724 may incorporate rule evaluation. Rule evaluation may, for example, parse network access requests and apply the parsed information to network access rules. The network access rule facility 724 may also or instead provide updated rules and policies to the enterprise facility 702.

When a threat or policy violation is detected by the threat management facility 700, the threat management facility 700 may perform or initiate remedial action through a remedial action facility 728. Remedial action may take a variety of forms, such as terminating or modifying an ongoing process or interaction, issuing an alert, sending a warning to a client or administration facility 734 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 744, quarantining a related application (or files, processes or the like), terminating the application or device, isolating the application or device, moving a process or application code to a sandbox for evaluation, isolating the client facility 744 to a location or status within the network that restricts network access, blocking a network access port from a client facility 744, reporting the application to an administration facility 734, or the like, as well as any combination of the foregoing.

Remedial action may be provided as a result of a detection of a threat or violation. The detection techniques facility 730 may include tools for monitoring the network or managed devices within the network 702. The detection techniques facility 730 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 700 detects threats and violations to established policy, may require the ability to test the system, either at the system level or for a particular computing component. The testing facility 718 may allow the administration facility 434 to coordinate the testing of the security configurations of client facility computing facilities on a network. For example, the administration facility 734 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 734. The administration facility 734 may be able to determine the level of preparedness of the client facility 744 based on the reported information. Remedial action may be taken for any of the client facilities 744 as determined by the administration facility 734.

The threat management facility 700 may provide threat protection across the network 702 to devices such as clients 744, a server facility 742, an administration facility 734, a firewall 738, a gateway, one or more network devices (e.g., hubs and routers 748, a threat management or other appliance 740, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 702, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 702. The endpoint computer security facility 752 may be an application locally loaded onto any corresponding computer platform or computer support component, either for local security functions or for management by the threat management facility 700 or other remote resource, or any combination of these.

The network 702 may include a plurality of client facility computing platforms on which the endpoint computer security facility 752 is installed. A client facility computing platform may be a computer system that is able to access a service on another computer, such as a server facility 742, via a network. The endpoint computer security facility 752 may, in corresponding fashion, provide security in any suitable context such as among a plurality of networked applications, for a client facility connecting to an application server facility 742, for a web browser client facility connecting to a web server facility 742, for an e-mail client facility retrieving e-mail from an Internet 754 service provider's mail storage servers 742 or web site, and the like, as well as any variations or combinations of the foregoing.

The network 702 may include one or more of a variety of server facilities 742, such as application servers, communications servers, file servers, database servers, proxy servers, mail servers, fax servers, game servers, web servers, and the like. A server facility 742, which may also be referred to as a server facility 742 application, server facility 742 operating system, server facility 742 computer, or the like, may be any device(s), application program(s), operating system(s), or combination of the foregoing that accepts client facility connections in order to service requests from clients 744. In embodiments, the threat management facility 700 may provide threat protection to server facilities 742 within the network 702 as load conditions and application changes are made.

A server facility 742 may include an appliance facility 740, where the appliance facility 740 provides specific services to other devices on the network. Simple server facility 742 appliances may also be utilized across the network 702 infrastructure, such as switches, routers, hubs, gateways, print servers, modems, and the like. These appliances may provide interconnection services within the network 702, and therefore may advance the spread of a threat if not properly protected.

A client facility 744 may be protected from threats from within the network 702 using a local or personal firewall, which may be a hardware firewall, software firewall, or combination, that controls network traffic to and from a client. The local firewall may permit or deny communications based on a security policy. Another component that may be protected by an endpoint computer security facility 752 is a network firewall facility 738, which may include hardware or software, in a standalone device or integrated with another network component, that may be configured to permit, deny, or proxy data through a network 702.

The interface between the threat management facility 700 and the network 702, and through the appliance facility 740 to embedded endpoint computer security facilities, may include a set of tools that may be the same or different for various implementations, and may allow each network administrator to implement custom controls. In embodiments, these controls may include both automatic actions and managed actions. The administration facility 734 may configure policy rules that determine interactions. The administration facility 734 may also establish license management, which in turn may further determine interactions associated with licensed applications. In embodiments, interactions between the threat management facility 700 and the network 702 may provide threat protection to the network 702 by managing the flow of network data into and out of the network 702 through automatic actions that may be configured by the threat management facility 700 for example by action or configuration of the administration facility 734.

Client facilities 744 within the network 702 may be connected to the network 702 by way of wired network facilities 748A or wireless network facilities 748B. Mobile wireless facility clients 744, because of their ability to connect to a wireless network access point, may connect to the Internet 754 outside the physical boundary of the network 702, and therefore outside the threat-protected environment of the network 702. Such a client 744, if not for the presence of a locally-installed endpoint computer security facility 752, may be exposed to a malware attack or perform actions counter to network 702 policies. Thus, the endpoint computer security facility 752 may provide local protection against various threats and policy violations. The threat management facility 700 may also or instead be configured to protect the out-of-enterprise facility 702 mobile client facility (e.g., the clients 744) through interactions over the Internet 754 (or other network) with the locally-installed endpoint computer security facility 752. Thus mobile client facilities that are components of the network 702 but temporarily outside connectivity with the network 702 may be provided with the threat protection and policy control the same as or similar to client facilities 744 inside the network 702. In addition, mobile client facilities 744 may receive the same interactions to and from the threat management facility 700 as client facilities 744 inside the enterprise facility 702, such as by receiving the same or equivalent services via an embedded endpoint computer security facility 752.

Interactions between the threat management facility 700 and the components of the network 702, including mobile client facility extensions of the network 702, may ultimately be connected through the Internet 754 or any other network or combination of networks. Security-related or policy-related downloads and upgrades to the network 702 may be passed from the threat management facility 700 through to components of the network 702 equipped with the endpoint computer security facility 752. In turn, the endpoint computer security facility 752 components of the enterprise facility or network 702 may upload policy and access requests back across the Internet 754 and through to the threat management facility 700. The Internet 754 however, is also the path through which threats may be transmitted from their source, and an endpoint computer security facility 752 may be configured to protect a device outside the network 702 through locally-deployed protective measures and through suitable interactions with the threat management facility 700.

Thus, if the mobile client facility were to attempt to connect into an unprotected connection point, such as at a secondary location 708 that is not a part of the network 702, the mobile client facility 744 may be required to request network interactions through the threat management facility 700, where contacting the threat management facility 700 may be performed prior to any other network action. In embodiments, the client facility's 744 endpoint computer security facility 752 may manage actions in unprotected network environments such as when the client facility (e.g., client 744F) is in a secondary location 408, where the endpoint computer security facility 752 may dictate what applications, actions, resources, users, etc. are allowed, blocked, modified, or the like.

The secondary location 708 may have no endpoint computer security facilities 752 as a part of its components, such as its firewalls 738B, servers 742B, clients 744G, hubs and routers 748C-D, and the like. As a result, the components of the secondary location 708 may be open to threat attacks, and become potential sources of threats, as well as any mobile enterprise facility clients 744B-F that may be connected to the secondary location's 708 network. In this instance, these components may now unknowingly spread a threat to other connected to the network 702.

Some threats do not come directly from the Internet 754. For example, a physical proximity threat 710 may be deployed on a client device while that device is connected to an unprotected network connection outside the enterprise facility 702, and when the device is subsequently connected to a client 744 on the network 702, the device can deploy the malware or otherwise pose a threat. In embodiments, the endpoint computer security facility 752 may protect the network 702 against these types of physical proximity threats 710, for instance, through scanning any device prior to allowing data transfers, through security validation certificates, through establishing a safe zone within the network 702 to receive data for evaluation, and the like.

Figure 8:
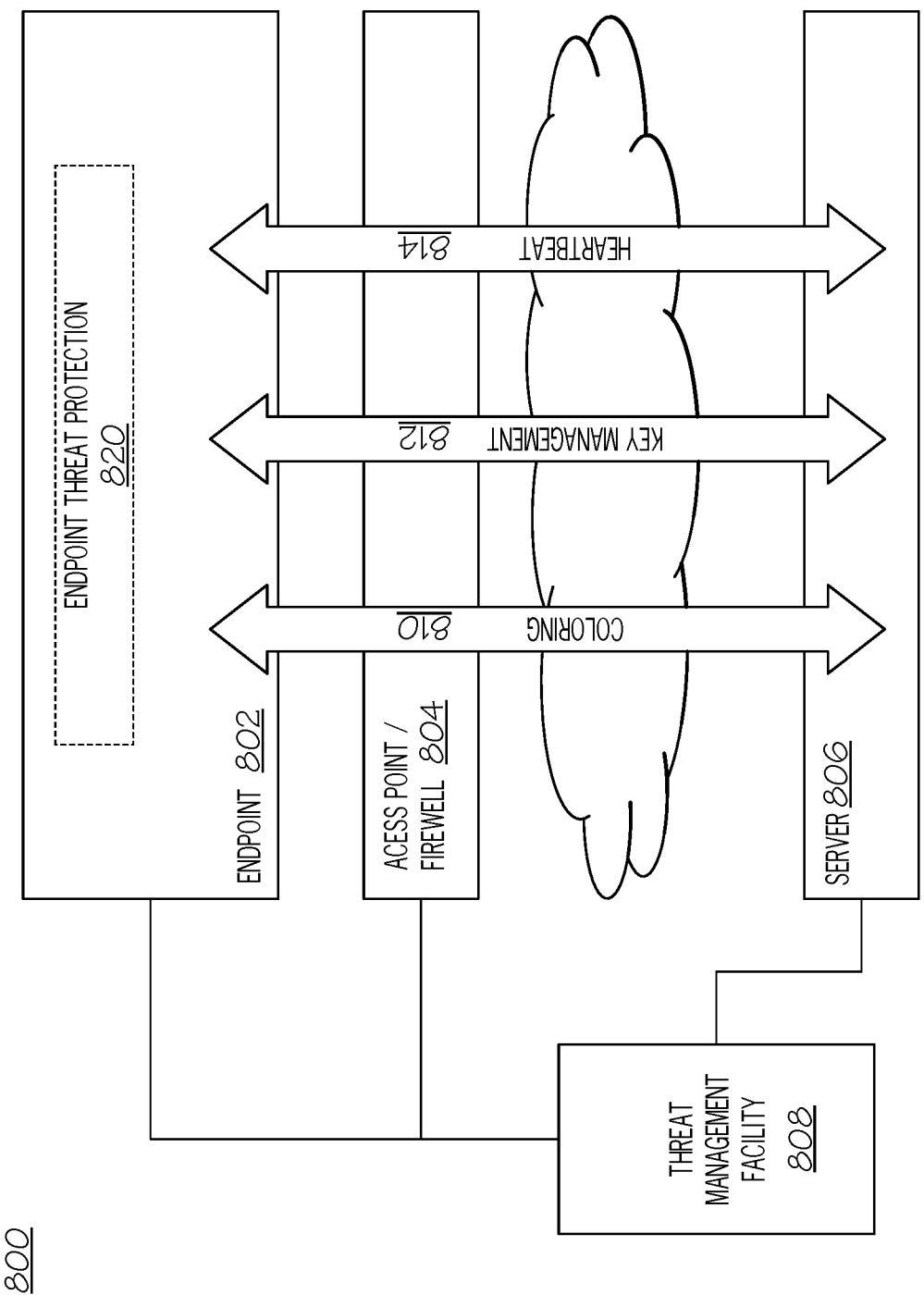
FIG. 8 depicts a diagram of an exemplary threat management system according to an example embodiment.

FIG. 8 illustrates one example of a threat management system 800 as contemplated herein, according to an example embodiment. In general, the threat management system 800 may include an endpoint 802 for example, a laptop, or a device such as an IoT device, an access point 804, a server 806 and a threat management facility 808 in communication with one another directly or indirectly through a data network 805, for example, as generally described above. Each of the entities depicted in FIG. 8, may, for example, be implemented on one or more computing devices such as the computing device described above with reference to FIGS. 1 and 2.

A number of systems may be distributed across these various components to support threat management, for example, including a coloring system 810, a key management system 812 and a heartbeat system 814, each of which may include software components executing on any of the foregoing system components, and each of which may communicate with the threat management facility 808 or an endpoint threat protection agent 820 executing on an endpoint 802, on an access point or firewall 804, or on a server 806 to support improved threat detection and remediation.

The coloring system 810 may be used to label or 'color' software objects for improved tracking and detection of potentially harmful activity. The coloring system 810 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 812 may support management of keys for the endpoint 802 in order to selectively permit or prevent access to content on the endpoint 802 on a file-specific basis, a process-specific basis, an application-specific basis, a user-specific basis, or any other suitable basis in order to prevent data leakage, and in order to support more fine-grained and immediate control over access to content on the endpoint 802 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 814 may be used to provide periodic or aperiodic information from an endpoint about system health, security, status, etc. A heartbeat may be encrypted or plaintext, or some combination of these, and may be communicated unidirectionally (e.g., from the endpoint 802 to the threat management facility 808) or bidirectionally (e.g., between the endpoint 802 and the server 806, or any other pair of system components) on a useful schedule.

In implementations, the access point or firewall 804 may use the heartbeat 814 to report a potential or actual compromise of a device based, for example, on a color of the device, or based on one or more reliability index values, the meeting of one or more reliability index thresholds, the rate of change of one or more reliability index values, etc. The heartbeat 814 from the access point 804 may be communicated to a server 806, for example, and administrative server or directly or indirectly to a threat management facility 808. If the endpoint device 802 has an endpoint threat protection facility 820, the facility 820 may be used to further investigate the status, or to take remedial measures, again by communication using the secure heartbeat 814.

In general, these various monitoring and management systems may cooperate to provide improved threat detection and response. For example, the coloring system 810 may be used to evaluate when a particular device is potentially compromised, and a potential threat may be confirmed based on an interrupted heartbeat from the heartbeat system 814. The key management system 812 may then be used to revoke keys to a process so that no further files can be opened, deleted or otherwise modified. More generally, the cooperation of these systems enables a wide variety of reactive measures that can improve detection and remediation of potential threats to an endpoint.

In some implementations, the coloring 810 and/or the heartbeat 814 may be used to assign a device to a VLAN. In some implementations, information about the status of the device, for example, health status, may be provided by a security module, and the status of the device may be used to assign the device to VLAN. For example, the endpoint threat detection 820 may monitor the device. A change in health status as reported by the threat detection 820 may be used to request that an access point 802 assign or reassign a device to a VLAN. For example, a device that meets security requirements may continue to use or may be assigned to a particular VLAN and a device that has one or more flagged security issues, such as software that is not up to date, a modified operating system, identified malware, etc., may be assigned or reassigned to another VLAN. The heartbeat 814 may be used as a secure communication channel to report the status of the endpoint.

In some implementations, the access point 804 may receive status information from the endpoint, and assign or reassign the endpoint 802 to the VLAN based on the status information. In some implementations, the server 806 or the threat management facility 508 may receive information about the endpoint 802 and direct the wireless access point to assign or re-assign the endpoint 802 to a VLAN. In some implementations, the threat management facility 808 may direct the endpoint 802 to a VLAN without the cooperation of the access point, or by notifying the access point 804 and the endpoint 802 of the change at the same time.

In some implementations, in connection with the assignment or reassignment of an endpoint 802 to a VLAN, the threat management facility 808 or the server 806 provides an authentication credential to the endpoint 802, which the endpoint can, in turn, present to the access point 804 for VLAN access.

In some implementations, an access point or firewall 804 may color the endpoint 802 based at least in part on activity or behavior of the endpoint 802. The coloring may be used by the access point or firewall 804 to assign or reassign the endpoint to VLAN. For example, if a color that indicates a potential compromise is assigned to the endpoint 802, the endpoint may be assigned or reassigned to a VLAN. Likewise, the assignment to a VLAN may be used as a color to consider the behavior of the VLAN in context.

Figure 9:
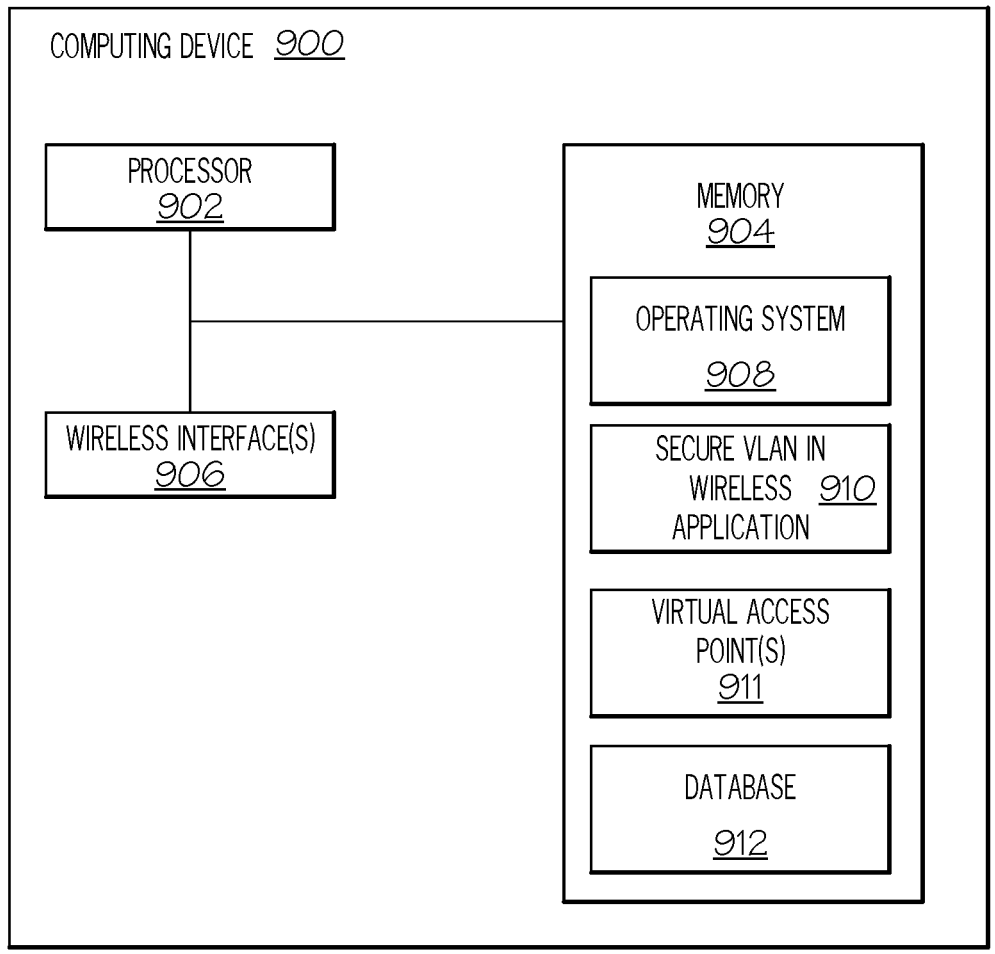
FIG. 9 depicts a diagram of an example computing device according to an example embodiment.

FIG. 9 is a diagram of an example computing device 900, according to an example embodiment. As shown, the computing device 900 includes one or more processors 902, non-transitory computer readable medium or memory 904, I/O interface devices 906 (e.g., wireless communications, etc.) and a network interface 908. The computer readable medium 904 may include an operating system 908, a secure VLAN application 910 for providing a secure VLAN within a network environment and a data section 912 (e.g., for storing VLAN data, etc.).

In operation, the processor 902 may execute the application 910 stored in the computer readable medium 904. The application 910 may include software instructions that, when executed by the processor, cause the processor to perform operations for a applying network access control configurations within a network having a network switch, as described and shown in FIGS. 3-6.

The application program 910 may operate in conjunction with the data section 912 and the operating system 908. The device 900 may communicate with other devices (e.g., a wireless access point) via the I/O interfaces 906.

Although the foregoing Figures illustrate various embodiments of the disclosed systems and methods, additional and/or alternative embodiments are contemplated as falling within the scope of this disclosure. For example, in one embodiment, this disclosure provides for a method for applying a network access control configuration associated with a network switch comprising receiving, by one or more processors of a computer system, information related to device health of an electronic device, determining, by the one or more processors of the computer system, a health status of the electronic device based at least in part on the received information related to the device health of the electronic device, and requesting, by a network switch having a port connected to the electronic device, the health status of the electronic device from the one or more processors of the computer system. The method also includes receiving, by the one or more processors of the computer system, the request for the health status of the electronic device from the network switch, transmitting, by the one or more processors of the computer system, the health status of the electronic device to the network switch, and receiving, by the network switch, the transmitted health status of the electronic device. The method may further include evaluating, by the network switch, the transmitted health status of the electronic device using network access rules corresponding to health statuses, and applying, by the network switch, a network access control configuration to the port of the network switch based on the evaluating the transmitted health status of the electronic device using the network access rules.

In another embodiment of the method, the applying the network access control configuration includes changing a virtual local area network (VLAN) associated with the port.

In a further embodiment of the method, the applying the network access control configuration includes applying an access control list (ACL) configuration.

In yet another embodiment of the method, the one or more processors of the computer system is a cloud-based threat management system configured to manage the network switch, and the network switch is located in an enterprise facility being managed by the cloud-based threat management system.

In yet a further embodiment of the method, the determining, by the one or more processors of the computer system, the health status of the electronic device based at least in part on the received information related to the device health of the electronic device further comprises analyzing, by the one or more processors of the computer system, historical device activity across a plurality of devices associated with a user account associated with the electronic device.

In another embodiment of the method, the historical device activity includes device activity of a mobile device associated with the user account that is not connected to the switch.

In a further embodiment, the method includes subscribing, by the network switch, to updates with the health status of the electronic device from the one or more processors of the computer system.

In yet another embodiment the method includes providing, by the one or more processors of the computer system, a change update to the health status of the electronic device, reevaluating, by the network switch, the network access control configuration based on the change update to the health status of the electronic device, and applying, by the network switch, a new network access control configuration to the port of the switch based on the reevaluating.

In yet a further embodiment the method includes sending, by the one or more processors of the computer system, updates regarding the health status of the electronic device at regular intervals.

In another embodiment the method includes updating, by the network switch, the one or more processors of the computer system with the applied network access control configuration for the port of the network switch after the applying.

In another embodiment, the disclosure provides for a computer system, that includes a network switch, threat management computer system having one or more processors, one or more memory devices coupled to the one or more processors and/or the network switch; and one or more computer readable storage devices coupled to the one or more processors and/or the network switch. The one or more storage devices contain program code executable by the one or more processors and/or the network switch via the one or more memory devices to implement a method for applying a network access control configuration associated with the network switch. The method includes receiving, by the one or more processors of the threat management computer system, information related to device health of an electronic device determining, by the one or more processors of the threat management computer system, a health status of the electronic device based at least in part on the received information related to the device health of the electronic device, and requesting, by the network switch having the port connected to the electronic device, the health status of the electronic device from the one or more processors of the threat management computer system. The method also includes receiving, by the one or more processors of the threat management computer system, the request for the health status of the electronic device from the network switch, transmitting, by the one or more processors of the threat management computer system, the health status of the electronic device to the network switch, and receiving, by the network switch, the transmitted health status of the electronic device. The method may also include evaluating, by the network switch, the transmitted health status of the electronic device using network access rules corresponding to health statuses, and applying, by the network switch, a network access control configuration to the port of the network switch based on the evaluating the transmitted health status of the electronic device using the network access rules.

In another embodiment of the computer system, the method of applying the network access control configuration includes at least one of: changing a virtual local area network (VLAN) associated with the port; and applying an access control list (ACL) configuration.

In a further embodiment of the computer system, the method further includes subscribing, by the network switch, to updates with the health status of the electronic device from the one or more processors of the threat management computer system, sending, by the one or more processors of the threat management computer system, updates regarding the health status of the electronic device at regular intervals, providing, by the one or more processors of the threat management computer system, a change update to the health status of the electronic device, reevaluating, by the network switch, the network access control configuration based on the change update to the health status of the electronic device, and applying, by the network switch, a new network access control configuration to the port of the switch based on the reevaluating.

In yet another embodiment of the computer system, the method of determining, by the one or more processors of the threat management computer system, the health status of the electronic device based at least in part on the received information related to the device health of the electronic device further comprises: analyzing, by the one or more processors of the threat management computer system, historical device activity across a plurality of devices associated with a user account associated with the electronic device, wherein the historical device activity includes device activity of a mobile device associated with the user account that is not connected to the switch.

In yet a further embodiment of the computer system, the one or more processors of the threat management computer system is a cloud-based threat management system configured to manage the network switch, and the network switch is located in an enterprise facility being managed by the cloud-based threat management system.

In another embodiment, the disclosure provides for a computer program product for applying a network access control configuration associated with the network switch, the computer program product comprising: one or more computer readable storage media having computer readable program code collectively stored on the one or more computer readable storage media, the computer readable program code being executed by one or more processors of a computer system, including a threat management computer system and a network switch connected to the threat management computer system, to cause the computer system to perform a method. The method includes receiving, by the one or more processors of the threat management computer system, information related to device health of an electronic device, determining, by the one or more processors of the threat management computer system, a health status of the electronic device based at least in part on the received information related to the device health of the electronic device, and requesting, by the network switch having the port connected to the electronic device, the health status of the electronic device from the one or more processors of the threat management computer system. The method further includes receiving, by the one or more processors of the threat management computer system, the request for the health status of the electronic device from the network switch, transmitting, by the one or more processors of the threat management computer system, the health status of the electronic device to the network switch, and receiving, by the network switch, the transmitted health status of the electronic device. The method may still further include evaluating, by the network switch, the transmitted health status of the electronic device using network access rules corresponding to health statuses, and applying, by the network switch, a network access control configuration to the port of the network switch based on the evaluating the transmitted health status of the electronic device using the network access rules.

In another embodiment of the computer program product, the method of applying the network access control configuration includes at least one of: changing a virtual local area network (VLAN) associated with the port; and applying an access control list (ACL) configuration.

In a further embodiment of the computer program product, the method further includes subscribing, by the network switch, to updates with the health status of the electronic device from the one or more processors of the threat management computer system, sending, by the one or more processors of the threat management computer system, updates regarding the health status of the electronic device at regular intervals, providing, by the one or more processors of the threat management computer system, a change update to the health status of the electronic device, reevaluating, by the network switch, the network access control configuration based on the change update to the health status of the electronic device, and applying, by the network switch, a new network access control configuration to the port of the switch based on the reevaluating.

In yet another embodiment of the computer program product, the method of determining, by the one or more processors of the threat management computer system, the health status of the electronic device based at least in part on the received information related to the device health of the electronic device further comprises: analyzing, by the one or more processors of the threat management computer system, historical device activity across a plurality of devices associated with a user account associated with the electronic device, wherein the historical device activity includes device activity of a mobile device associated with the user account that is not connected to the switch.

In yet a further embodiment of the computer program product, the one or more processors of the threat management computer system is a cloud-based threat management system configured to manage the network switch, and the network switch is located in an enterprise facility being managed by the cloud-based threat management system.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for secure VLAN in wireless networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for applying a network access control configuration associated with a network switch comprising:
  receiving, by one or more processors of a computer system, information related to device health of an electronic device;
  determining, by the one or more processors of the computer system, a health status of the electronic device based at least in part on the received information related to the device health of the electronic device;
  requesting, by a network switch having a port connected to the electronic device, the health status of the electronic device from the one or more processors of the computer system;
  receiving, by the one or more processors of the computer system, the request for the health status of the electronic device from the network switch;
  transmitting, by the one or more processors of the computer system, the health status of the electronic device to the network switch;
  receiving, by the network switch, the transmitted health status of the electronic device;
  evaluating, by the network switch, the transmitted health status of the electronic device using network access rules corresponding to health statuses; and
  applying, by the network switch, a network access control configuration to the port of the network switch based on the evaluating the transmitted health status of the electronic device using the network access rules.

2. The method of claim 1, wherein the applying the network access control configuration includes changing a virtual local area network (VLAN) associated with the port.

3. The method of claim 1, wherein the applying the network access control configuration includes applying an access control list (ACL) configuration.

4. The method of claim 1, wherein:
  the one or more processors of the computer system is a cloud-based threat management system configured to manage the network switch, and
  the network switch is located in an enterprise facility being managed by the cloud-based threat management system.

5. The method of claim 1, wherein the determining, by the one or more processors of the computer system, the health status of the electronic device based at least in part on the received information related to the device health of the electronic device further comprises:
  analyzing, by the one or more processors of the computer system, historical device activity across a plurality of devices associated with a user account associated with the electronic device.

6. The method of claim 5, wherein the historical device activity includes device activity of a mobile device associated with the user account that is not connected to the switch.

7. The method of claim 1, further comprising subscribing, by the network switch, to updates with the health status of the electronic device from the one or more processors of the computer system.

8. The method of claim 7, further comprising:
  providing, by the one or more processors of the computer system, a change update to the health status of the electronic device;
  reevaluating, by the network switch, the network access control configuration based on the change update to the health status of the electronic device; and
  applying, by the network switch, a new network access control configuration to the port of the switch based on the reevaluating.

9. The method of claim 7, further comprising sending, by the one or more processors of the computer system, updates regarding the health status of the electronic device at regular intervals.

10. The method of claim 1, further comprising: updating, by the network switch, the one or more processors of the computer system with the applied network access control configuration for the port of the network switch after the applying.

11. A computer system, comprising:
  a network switch;
  a threat management computer system having one or more processors;
  one or more memory devices coupled to the one or more processors and/or the network switch; and
  one or more computer readable storage devices coupled to the one or more processors and/or the network switch, wherein the one or more storage devices contain program code executable by the one or more processors and/or the network switch via the one or more memory devices to implement a method for applying a network access control configuration associated with the network switch, the method comprising:
    receiving, by the one or more processors of the threat management computer system, information related to device health of an electronic device;
    determining, by the one or more processors of the threat management computer system, a health status of the electronic device based at least in part on the received information related to the device health of the electronic device;
    requesting, by the network switch having the port connected to the electronic device, the health status of the electronic device from the one or more processors of the threat management computer system;
    receiving, by the one or more processors of the threat management computer system, the request for the health status of the electronic device from the network switch;
    transmitting, by the one or more processors of the threat management computer system, the health status of the electronic device to the network switch;
    receiving, by the network switch, the transmitted health status of the electronic device;
    evaluating, by the network switch, the transmitted health status of the electronic device using network access rules corresponding to health statuses; and
    applying, by the network switch, a network access control configuration to the port of the network switch based on the evaluating the transmitted health status of the electronic device using the network access rules.

12. The computer system of claim 11, wherein applying the network access control configuration includes at least one of:
  changing a virtual local area network (VLAN) associated with the port; and
  applying an access control list (ACL) configuration.

13. The computer system of claim 11, wherein the method further comprises:

subscribing, by the network switch, to updates with the health status of the electronic device from the one or more processors of the threat management computer system;

sending, by the one or more processors of the threat management computer system, updates regarding the health status of the electronic device at regular intervals;

providing, by the one or more processors of the threat management computer system, a change update to the health status of the electronic device;

reevaluating, by the network switch, the network access control configuration based on the change update to the health status of the electronic device; and applying, by the network switch, a new network access control configuration to the port of the switch based on the reevaluating.

14. The computer system of claim 11, wherein the determining, by the one or more processors of the threat management computer system, the health status of the electronic device based at least in part on the received information related to the device health of the electronic device further comprises:

analyzing, by the one or more processors of the threat management computer system, historical device activity across a plurality of devices associated with a user account associated with the electronic device, wherein the historical device activity includes device activity of a mobile device associated with the user account that is not connected to the switch.

15. The computer system of claim 11, wherein:

the one or more processors of the threat management computer system is a cloud-based threat management system configured to manage the network switch, and the network switch is located in an enterprise facility being managed by the cloud-based threat management system.

16. A computer program product for applying a network access control configuration associated with the network switch, the computer program product comprising:

one or more non-transitory computer readable storage media having computer readable program code collectively stored on the one or more non-transitory computer readable storage media, the computer readable program code being executed by one or more processors of a computer system, including a threat management computer system and a network switch connected to the threat management computer system, to cause the computer system to perform a method comprising:

receiving, by the one or more processors of the threat management computer system, information related to device health of an electronic device;

determining, by the one or more processors of the threat management computer system, a health status of the electronic device based at least in part on the received information related to the device health of the electronic device;

requesting, by the network switch having the port connected to the electronic device, the health status of the electronic device from the one or more processors of the threat management computer system;

receiving, by the one or more processors of the threat management computer system, the request for the health status of the electronic device from the network switch;

transmitting, by the one or more processors of the threat management computer system, the health status of the electronic device to the network switch;

receiving, by the network switch, the transmitted health status of the electronic device;

evaluating, by the network switch, the transmitted health status of the electronic device using network access rules corresponding to health statuses; and applying, by the network switch, a network access control configuration to the port of the network switch based on the evaluating the transmitted health status of the electronic device using the network access rules.

17. The computer program product of claim 16, wherein applying the network access control configuration includes at least one of:

changing a virtual local area network (VLAN) associated with the port; and applying an access control list (ACL) configuration.

18. The computer program product of claim 16, wherein the method further comprises:

subscribing, by the network switch, to updates with the health status of the electronic device from the one or more processors of the threat management computer system;

sending, by the one or more processors of the threat management computer system, updates regarding the health status of the electronic device at regular intervals;

providing, by the one or more processors of the threat management computer system, a change update to the health status of the electronic device;

reevaluating, by the network switch, the network access control configuration based on the change update to the health status of the electronic device; and applying, by the network switch, a new network access control configuration associated with the port of the switch based on the reevaluating.

19. The computer program product of claim 16, wherein the determining, by the one or more processors of the threat management computer system, the health status of the electronic device based at least in part on the received information related to the device health of the electronic device further comprises:

analyzing, by the one or more processors of the threat management computer system, historical device activity across a plurality of devices associated with a user account associated with the electronic device, wherein the historical device activity includes device activity of a mobile device associated with the user account that is not connected to the switch.

20. The computer program product of claim 16, wherein:

the one or more processors of the threat management computer system is a cloud-based threat management system configured to manage the network switch, and the network switch is located in an enterprise facility being managed by the cloud-based threat management system.

* * * * *